United States Patent [19]

Ishizuka

[11] Patent Number: 4,496,948

[45] Date of Patent: Jan. 29, 1985

[54] SYSTEM FOR INITIATING THE OPERATION OF AN ELECTRONICALLY-OPERATED DEVICE

[76] Inventor: Ken Ishizuka, 685 Laval Blvd. - Apt. 105, Laval, Canada, H7M 5C7

[21] Appl. No.: 382,125

[22] Filed: May 26, 1982

[51] Int. Cl.³ .......................... E05B 49/00; H04Q 3/00

[52] U.S. Cl. .................................. 340/825.31; 70/278

[58] Field of Search .............. 340/825.31; 70/DIG. 5, 70/278, 277; 235/382

[56] References Cited

U.S. PATENT DOCUMENTS 2,793,565 2/1974 Smith .
3,733,862 5/1973 Killmeyer .
3,872,435 3/1975 Cestaro .
4,079,605 3/1978 Bartels .
4,189,712 2/1980 Lemelson .
4,354,189 10/1982 Lemelson ....................... 340/825.31

FOREIGN PATENT DOCUMENTS 697495 11/1964 Canada .
927516 5/1973 Canada .
987017 4/1976 Canada .
1057377 6/1979 Canada .

*Primary Examiner*—Donald J. Yusko

[57] ABSTRACT

A system for initiating the operation of an electronically-operated device is disclosed. The system comprises a key unit having a code pattern mounted on a circle around the center thereof, a first rotating sensor eccentrically mounted with respect to the center of the key unit and adapted to scan the code pattern on the key unit and generate a first output signal which is representative of the code appearing on the key unit, a second sensor adapted to detect the rotational speed of the first rotating sensor and to generate a second output signal which is representative of the rotational speed of the first rotating sensor, a signal-processing circuit responsive to the first and the second output signals for generating a control signal which is independent of the rotational speed of the rotating sensor, and an electrically-operated device responsive to the control signal to perform a given function when a valid code is generated.

7 Claims, 11 Drawing Figures

FIG. 9
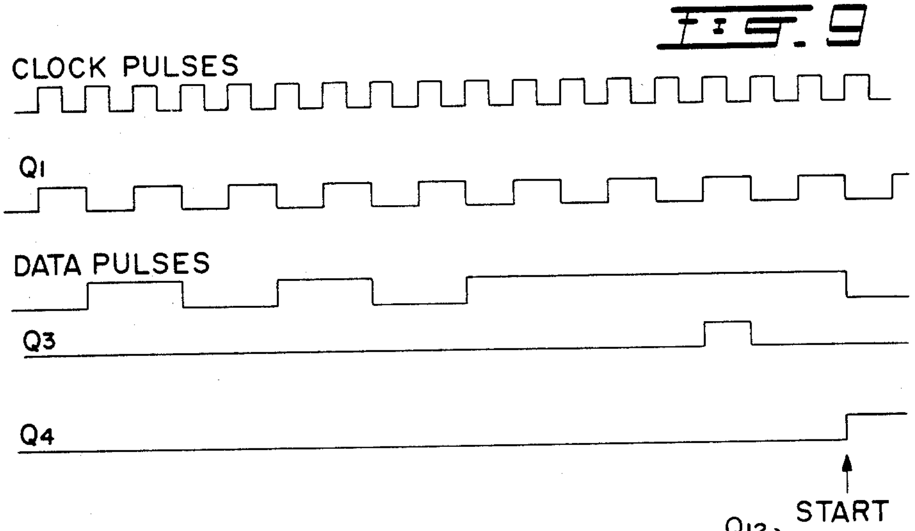
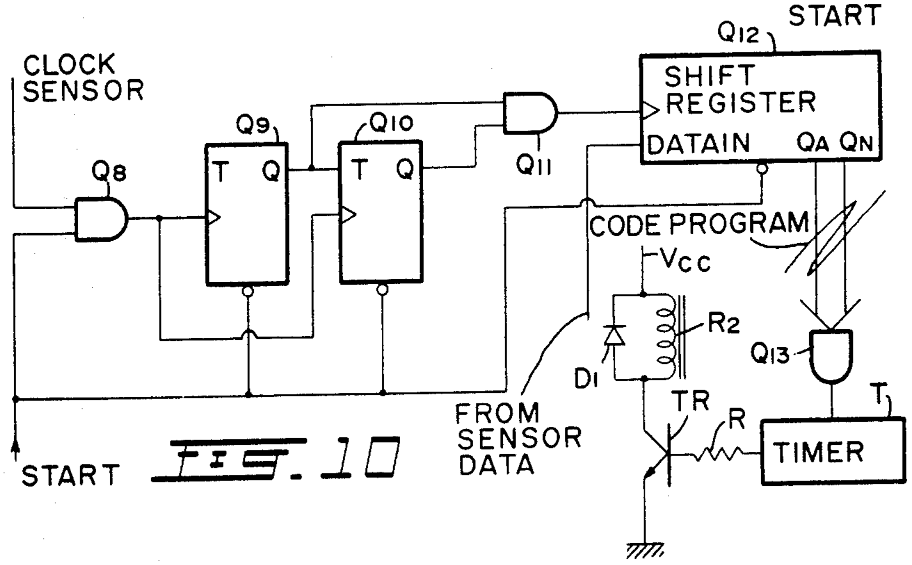
FIG. 10
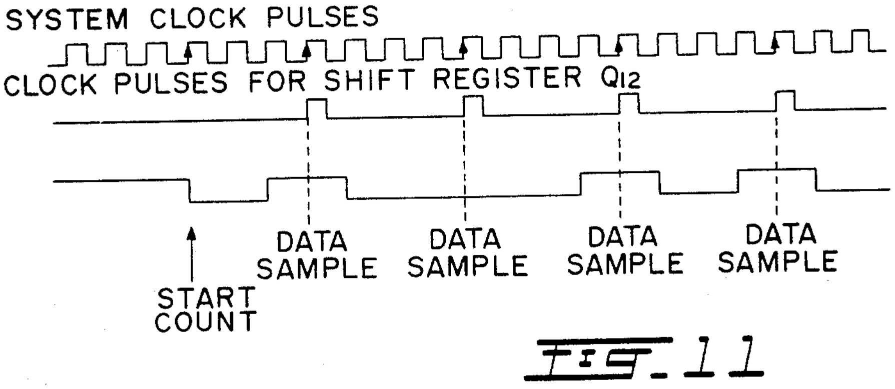
FIG. 11

SYSTEM FOR INITIATING THE OPERATION OF AN ELECTRONICALLY-OPERATED DEVICE

FIELD OF INVENTION

This invention relates to an electronic system for initiating the operation of a machine or a device and, more particularly, to a system which uses an electronically-controlled code to open a lock, start a machine, etc . . . .

BACKGROUND OF INVENTION

The conventional key-operated mechanical lock has been in existence for years, but suffers a number of important drawbacks, including its ability of being opened by master keys which are often easily available to unauthorized persons. Furthermore, burglars are becoming more and more sophisticated in their techniques of securing entries through doors equipped with mechanical locks. In order to overcome the above drawbacks, several types of electro-mechanical locks have been developed. However, these locks, too, have not completely solved the security problem. Electronically-operated locks using optical scanning devices for reading code patterns on a card or on a ring worn by a person, have also been developed. However, the known optical scanners require that the key unit be positioned in a specific orientation with respect to the scanner and/or moved in a specific direction, in order to properly detect the code patterns.

OBJECT OF INVENTION

It is the object of the present invention to provide a system which requires no specific orientation or displacement of the key unit, which has a code pattern of limited size and which provides quick operation of the machine, device, etc . . . .

SUMMARY OF INVENTION

The system in accordance with the present invention comprises a key unit having a code pattern mounted on a circle around the center thereof, a first rotating sensor excentrically mounted with respect to the center of the key unit and adapted to scan the code pattern on the key unit and generate a first output signal which is representative of the code appearing on the key unit, a second sensor adapted to detect the rotational speed of the first rotating sensor and to generate a second output signal which is representative of the rotational speed of the first rotating sensor, a signal-processing circuit responsive to the first and second output signals for generating a control signal which is independent of the rotational speed of the rotating sensor, and an electrically-operated device responsive to said control signal to perform a given function when a valid code is generated.

The code pattern may be a series of dark and light bars on a support with a predetermined bar spacing and having a print contrast signal greater than 90%, and the rotating sensor may be an optical scanner adapted to direct on optical signal at the code pattern on the key unit and detect the amplitude of the signal reflected by the code pattern. The code pattern may alternatively be a series of radial magnets mounted on a support with a predetermined magnet spacing, and the rotating sensor be a Hall-Effect device.

In a preferred embodiment of the invention, the rotating sensor is mounted in the face of a motor-operated disc, having its axis of rotation aligned with the center of the key unit, the rotating sensor being located at a pedetermined distance from the center of the key unit. A series of dark and light bars are painted on the edge of the disc, and the speed sensor is an optical scanner adapted to direct an optical signal at the code pattern on the edge of the disc and detect the amplitude of the signal effected by such a code pattern.

The signal-processing circuit comprises a first circuit responsive to the first and second output signals for detecting the start of the code pattern, a second circuit responsive to the first and second signal and to thus start a signal for generating a code program, and a comparator gate for comparing the code program with a predetermined reference code and for generating the abovementioned control signal when the code program matches the predetermined reference code.

BRIEF DESCRIPTION OF THE DRAWINGS

The invention will now be disclosed, by way of example, with reference to the accompanying drawings, in which:

FIG. 9 is a series of waveforms produced at the output of some of the elements of FIG. 8;

FIG. 10 is a more detailed block diagram of the circuit shown in FIG. 8; and FIG. 11 is a series of waveforms produced at the output of some of the elements of FIG. 10.

DETAILED DESCRIPTION OF INVENTION

Figure 1:
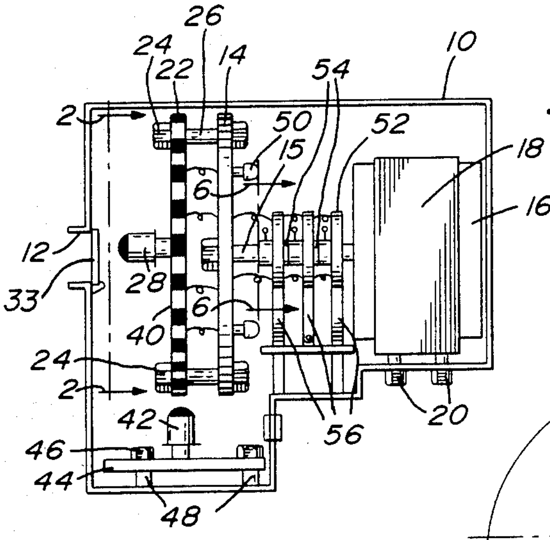
FIG. 1 is a side view of an electronic system in accordance with the present invention.

Referring to FIG. 1, there is shown a side view of an embodiment of a system in accordance with the invention which is enclosed in a housing 10 having a window 12 for the insertion of a key unit (not shown). A disc 14 is secured to the shaft 15 of a micro-motor 16, which is mounted on the bottom of the housing by a holder plate 18 and bolts 20. A second disc 22 is secured to the edges of board 14 by bolts 24. The two discs are mounted co-axially and held apart a predetermined distance by spacers 26. The axis of discs 14 and 22 is aligned with the center of the window 12.

Figure 2:
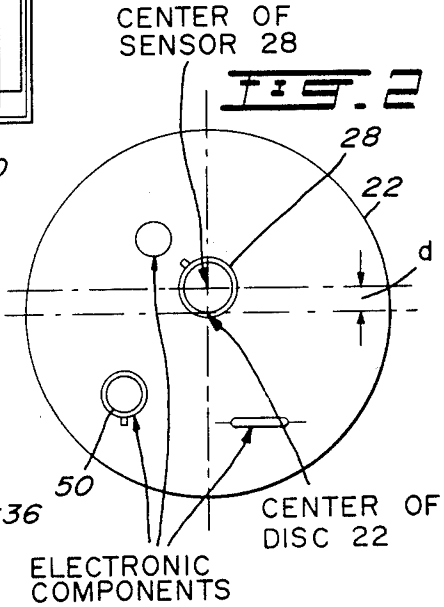
FIG. 2 is a view taken along line 2—2 of FIG. 1.
Figure 3:
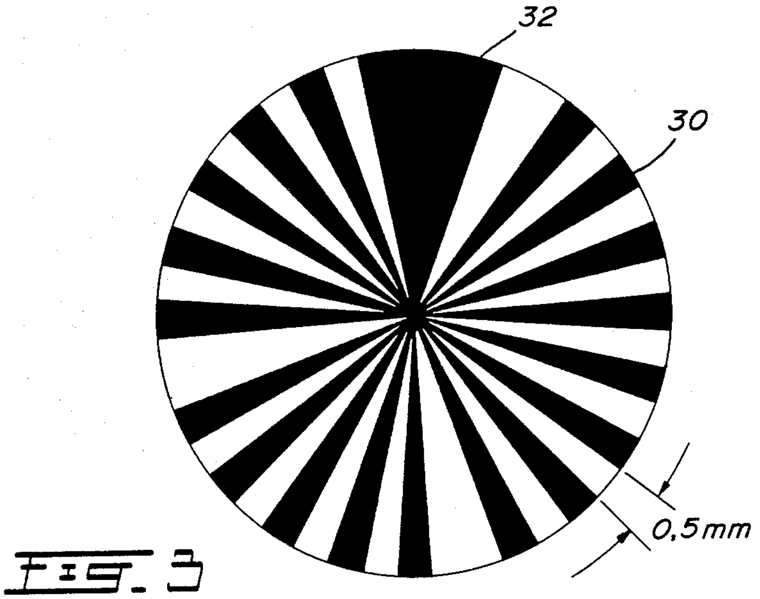
FIG. 3 is a front view of a key unit having a circular code pattern consisting of a series of dark and light bars printed on a suitable support.

As shown in FIG. 2, a sensor 28 is mounted on disc 22 at a predetermined distance "d" (about 2–2.5 mm) from the axis of the board for scanning a key which is adapted to be inserted in window 12. As shown in FIG. 3, the key face is provided with a code pattern consisting of a series of dark bars 30 located a predetermined distance apart on a shiny metallic surface, or printed on paper, with a print contrast of greater than 90%. A code start 32 is also provided by grouping together four consecutive bars. The spacing of the dark bars depends on the code pattern, the smaller distance the greater the number of available codes. A bar spacing, of 0.5 mm at the edge of a key having a diameter of 5.0–7.5 mm, will provide a code pattern having over one million codes which can be easily sensed by an optical reflective type sensor, such as the HEDS-1000. The above key may be mounted on a ring, a lighter head or any other devices to be carried by a person. The diameter of the key is such as to fit loosely in the window 12 in the housing 10. The sensor is mounted at a distance from the axis of the disc 22 corresponding to the spacing of the code patterns on the center of the key. It will be noted that the distance at which the sensor is mounted from the axis of the disc 22, depends on the size of the optical key, i.e. the number of bars and the spacing therebetween. Such distance should be minimized to reduce the size of the key as much as possible.

The distance between the sensor 28 and the key, when positioned behind a glass 33 held in window 12, should be kept close to the specification of the optical sensor. Such distance may be adjusted by moving the motor longitudinally in the holder plate 80 or varying the length of the spacer 26 between discs 14 and 22.

Figure 5:
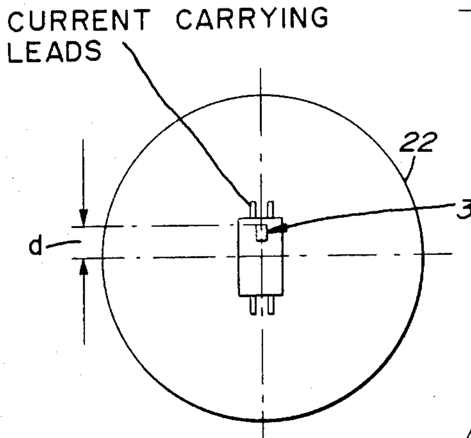
FIG. 5 is an alternative embodiment of that shown in FIG. 2.
Figure 4:
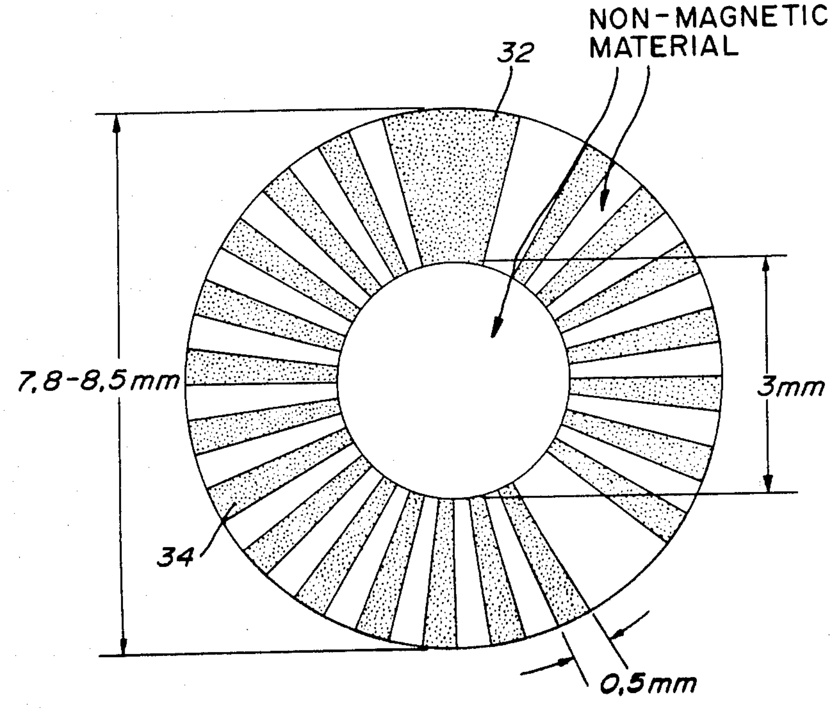
FIG. 4 is a front view of a key unit having a circular code pattern consisting of a series of magnets mounted on a suitable support.

FIG. 4 of the drawings shows an alternative embodiment of the key unit which consists of a plurality of permanent magnets 34 spaced by non-magnetic material. A Hall-Effect sensor device is used instead of an optical sensor. As commonly known, when a magnetic field is applied particularly across the direction of the current flow in a Hall-Effect device, a force is produced perpendicular to both the field and the current flow, producing a so-called Hall-Effect rotation. Applicant has found that Hall-Effect devices made of GaAs or InSb can produce a voltage of suitable amplitude to be detected by conventional circuitry. The spacing between the permanent magnets on the key would be about the same as with the printed bar code pattern and the diameter of the key may typically be between 7.5–8.5 mm. The Hall-Effect device 36 would then be mounted at a distance "d" between 3.9–4.25 mm from the axis of the board 22, as shown in FIG. 5, in order to align it with the radial magnets on the key. As it will be easily understood, when the permanent magnet is directly facing the Hall-Effect device, maximum output voltage will be obtained, whereas minimum output voltage will be detected when the Hall-Effect device is located between two permanent magnets.

Referring back to FIG. 1 of the drawings, a number of equally-spaced dark and light bars 40 are printed on the edge of disc 22. The number of bars 40 is a multiple (here four) of the bars on the key for a purpose to be disclosed later. A sensor 42 is mounted on a board 44, which is secured to the bottom of the housing 10 by bolts 46. Spacers 48 are provided to adjust the distance of the sensor 42 from the board 44. Sensor 42 is provided for detecting the rotational speed of the sensor 28 mounted on board 22 for a purpose to be disclosed later.

Figure 6:
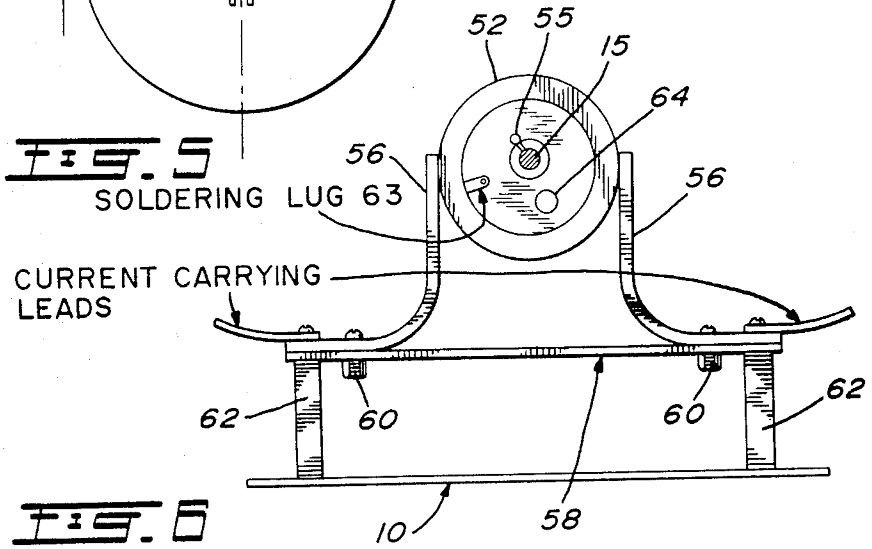
FIG. 6 is a view taken along line 6—6 of FIG. 1.

The discs 14 and 22 are preferably printed circuit boards for mounting the various elements 50 of the processing circuit to be disclosed later. A number of slip-rings 52, insulated by spacers 54, are secured to the motor shaft 15 by locking screws 55. As shown in FIG. 6, the power applied to the sensor and to the processing circuit is fed through contact springs 56 which are secured to the edge of an insulating board 58 by bolts 60. The insulating board is secured to the bottom of the housing through spacers 62. The wires from the electronic components of the circuit boards 14 and 22 are connected to soldering lugs 63 on the slip-rings 52. The wires leading to the slip-rings further away from the printed circuit boards pass through opening 64 in in the slip-rings.

Figure 7:
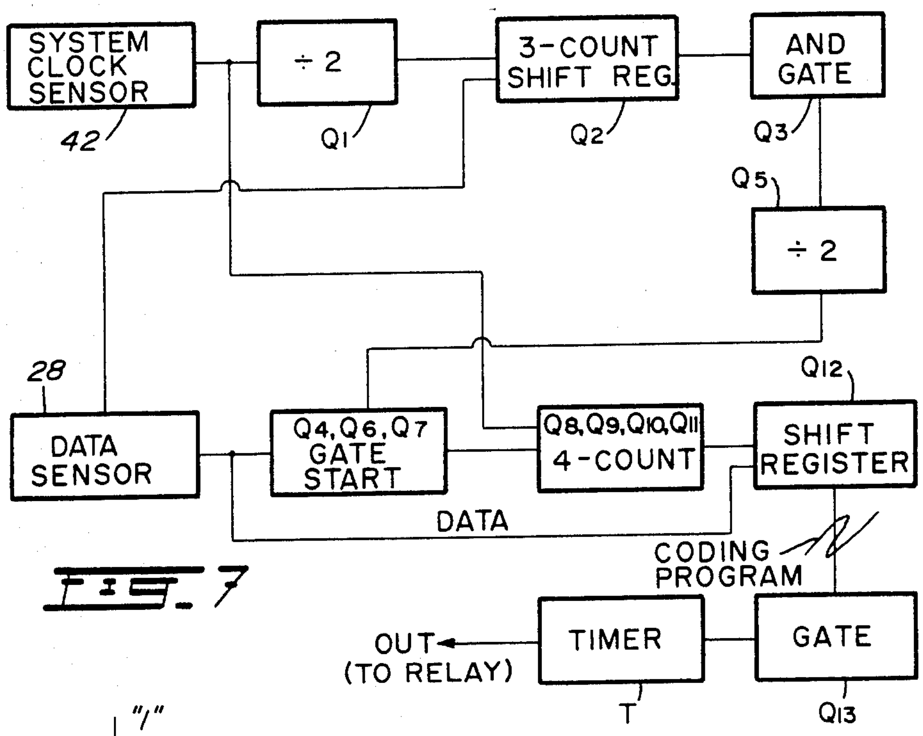
FIG. 7 is a general block diagram of the signal-processing circuit.

FIG. 7 of the drawings illustrates a block diagram of a signal processor circuit for initiating the operation of an electrically-operated device (such as a relay), using the previously-disclosed key and sensors 28 and 42. In the remaining portion of the description, sensor 28 will be called the DATA sensor, whereas sensor 42 will be referred to as the CLOCK sensor. The analog signals appearing at the output of the DATA and CLOCK sensors are fed to conventional digitizers (not shown) for producing digital pulses, such as shown in FIG. 9 of the drawings, for processing by digital circuitry.

Figure 8:
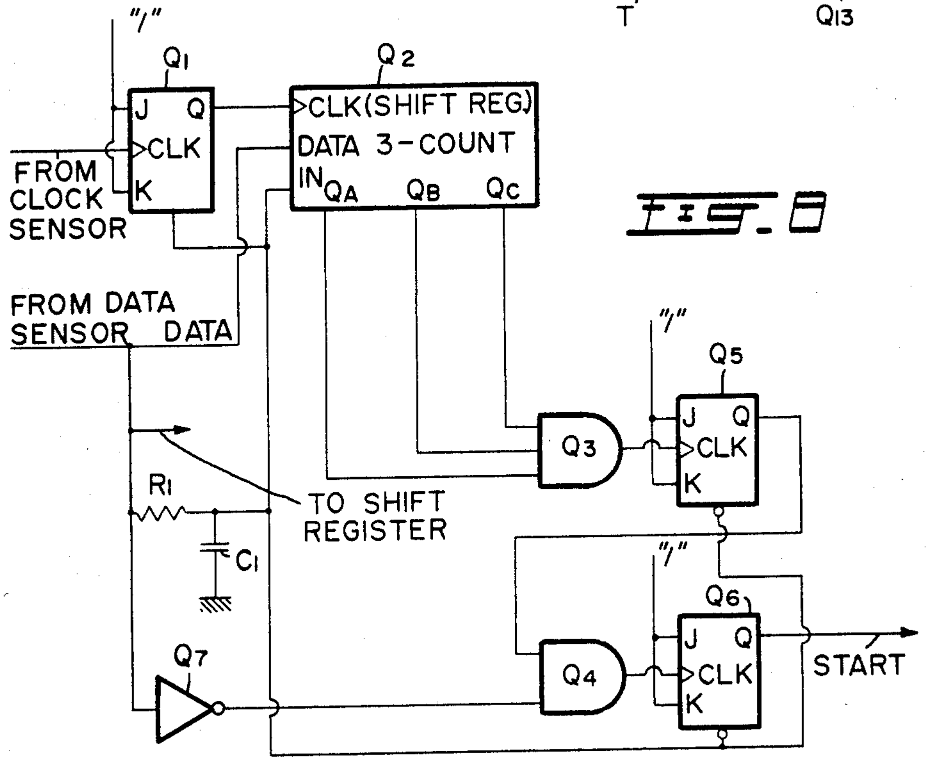
FIG. 8 is a more detailed block diagram of the circuit of FIG. 7.

Referring to FIGS. 7 and 8 and to the waveforms shown in FIG. 9, there is shown the required circuitry for detecting the start of the code pattern. Corresponding elements in FIGS. 7 and 8 are identified by the same reference characters. The clock pulses are used in the data-processing circuit for synchronizing the operation of the system independent of the speed of the motor which drives the DATA sensor. The waveform of the clock pulses is shown in the first line of FIG. 9. This signal is fed to a conventional divider by 2 flip-flop Q1, the output pulses of which have a width twice that of the original clock pulses, as shown in the second waveform of FIG. 9 of the drawings. These pulses are fed to the clock input of a conventional 3-count shift register Q2. The data pulses originating from the sensor 28 are also fed to shift register Q2. When the data pulse 32, which is set at four-bar widths, as mentioned previously, reaches the shift register, the outputs Qa, Qb, and Qc of the register all become high. The outputs Qa, Qb, and Qc of the shift register Q2 are connected to AND gate Q3, and when Qa, Qb, and Qc are high, the output of Q3 turns high, as shown by the waveform happening in the fourth line of FIG. 9 to trigger flip-flop Q5. The output Q of this flip-flop is connected to the first input of a AND gate Q4 having its output connected to a flip-flop Q6. When the data pulse turns low, the second input of AND gate Q4 turns high through inverter Q7 and the output of gate Q4 turns high to trigger flip-flop Q6. The output Q of flip-flop Q6 turns high to generate the start signal which is illustrated in the last waveform of FIG. 9.

A RC circuit, including resistor R1 and capacitor C1, is provided for resetting flip-flops Q5 and Q6 and shift register Q2 a predetermined time interval after data have ceased to appear at the output of the sensor.

Referring now to FIGS. 7 and 10 and to the waveform shown in FIG. 11, there is shown the circuitry required to process the code detector by the sensors 28. The clock pulses and the start pulse are fed to an AND gate Q8, the output of which is fed to a conventional 4-count circuit including flip-flops Q9 and Q10, which are connected in cascade and have their respective outputs Q connected to the input of a AND gate Q11. The output of gate Q11 turns high for a clock pulse width at every fourth pulse originating from the clock sensor 42, as shown by the waveform of the second line of FIG. 11, so as to be in synchronism with the data sensor 28. The output of the AND gate Q11 is fed to the clock input of a shift register Q12 which has a plurality of outputs Qa-Qn. The data are fed to the shift register and appear at the outputs Qa-Qn as a binary code having a number of digits corresponding to the code pattern appearing on the key. This binary code is the code program which is applied to predetermined inputs of a gate circuit Q13 which will operate a timer T when the state of the output Qa-Qn (high or low) of the shift register matches the preset state of the inputs of gate circuit Q13. The output of the timer T is connected to the base of a transistor Tr through a resistor R. Transistor Tr is connected in the circuit of a relay R2 which is energized from a source Vcc when the transistor is rendered conductive. Timer T is set so that the relay will remain operative for a period of time sufficient to operate the machine or lock, or any suitable device, when the right code key is used. A protective diode D1 is connected across the relay R2 to protect the transistor Tr against back voltages when the relay is cut off.

The start pulse is also applied to the reset terminal of flip-flops Q9 and Q10, as well as to the reset terminal of shift register Q12 to reset the processing circuit at the beginning of each code pattern.

In the afore-described circuits, the electronic components are identified as follows, as a preferred example:

| | |
|---|---|
| Q7 (½) and Q5 (½) = | SN54L S 112A |
| Q6 and Q9 (½) = | SN 54 LS 11aA |
| Q10 (½) = | 54 LS 112A |
| Q4, Q8, Q11 = | SN 5408 |
| Q3 (⅓) = | SN 54H11 |
| Q13 = | SN 54 H21 (Example) |
| Timer T = | LM555 |
| Tr = | 2 N 4237 |
| Q2 = | SN 5496 (3/5) |
| Q7 (1/6) = | SN 5416 |

Although the invention has been disclosed with reference to a preferred embodiment, it is to be understood that other alternatives are also envisaged, and that the invention is to be limited by the scope of the following claims only.

What I claim is:

1. A system for initiating the operation of an electronically-operated device, comprising:

(a) a key unit having a code pattern mounted on a circle around the center thereof;

(b) a first rotating sensor eccentrically mounted with respect to to the center of the key unit and adapted to scan the code pattern on the key unit and generate a first output signal which is representative of the code appearing on the key unit;

(c) a second sensor adapted to detect the rotational speed of the first rotating sensor and to generate a second output signal which is representative of the rotational speed of the first rotating sensor;

(d) a signal-processing circuit responsive to said first and second output signals for generating a control signal which is independent of the rotational speed of the rotating sensor; and (e) an electrically-operated device responsive to said control signal to perform a given function when a valid code is generated.

2. A system as defined in claim 1, wherein the code pattern is a series of radial dark and light bars on a support with a predetermined bar spacing and having a print contrast signal of greater than 90%, and wherein the rotating sensor is an optical scanner adapted to direct an optical signal at the code pattern on the key unit and detect the amplitude of the signal reflected by the code pattern.

3. A system as defined in claim 1, wherein the code pattern is a series of radial magnets mounted on a support with a predetermined magnet spacing and wherein the rotating sensor is a Hall-Effect device.

4. A system as defined in claim 2 or 3, wherein said support is mounted on the crown of a finger ring.

5. A system as defined in claim 1, further including a motor-operated disc, having its axis of rotation aligned with the center of the key unit and having a face facing said key unit, said rotating sensor being mounted on said face and located at a predetermined distance from the center of the key unit.

6. A system as defined in claim 5, wherein a series of dark and light bars are printed on the edge of said disc, and wherein said second sensor is an optical scanner adapted to direct an optical signal at the code pattern on the edge of the disc and detect the amplitude of the signal reflected by the code pattern on the edge of the disc.

7. A system as defined in claim 1, wherein said signal-processing unit comprises a first circuit means responsive to said first and second output signals for detecting the start of the code pattern, a second circuit means responsive to said first and second signals and to said start signal for generating a code program, and a comparator gate for comparing the code program and a predetermined reference code and for generating said control signal when the code program matches with said predetermined reference code.

* * * * *